United States Patent
Hamachi (10) Patent No.: US 10,117,099 B2
(45) Date of Patent: *Oct. 30, 2018

(54) COMMUNICATION APPARATUS, METHOD FOR CONTROLLING THE SAME, AND PROGRAM

(71) Applicant: CANON KABUSHIKI KAISHA, Tokyo (JP)

(72) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,279

(22) Filed: Nov. 2, 2017

(65) Prior Publication Data

US 2018/0054736 A1  Feb. 22, 2018

Related U.S. Application Data

(63) Continuation of application No. 15/212,999, filed on Jul. 18, 2016, now Pat. No. 9,843,932.

(30) Foreign Application Priority Data

Jul. 21, 2015  (JP) ................................. 2015-144398

(51) Int. Cl.
| | |
|---|---|
| *H04W 12/06* | (2009.01) |
| *H04W 8/22* | (2009.01) |
| *H04W 12/04* | (2009.01) |
| *H04L 29/06* | (2006.01) |
| *H04W 4/80* | (2018.01) |
| *H04W 84/12* | (2009.01) |

(52) U.S. Cl.
CPC ......... *H04W 12/06* (2013.01); *H04L 65/4076* (2013.01); *H04W 4/80* (2018.02); *H04W 8/22* (2013.01); *H04W 12/04* (2013.01); *H05K 999/99* (2013.01); *H04W 84/12* (2013.01)

(58) Field of Classification Search
CPC ..... H04W 12/06; H04W 12/04; H04W 4/008; H04W 8/22; H04W 84/12; H04L 65/4076
See application file for complete search history.

(56) References Cited

U.S. PATENT DOCUMENTS

2010/0232409 A1* 9/2010 Kim ..................... H04L 63/101
370/338

* cited by examiner

*Primary Examiner* — Nam Huynh
(74) *Attorney, Agent, or Firm* — Canon U.S.A., Inc. IP Division (57) ABSTRACT

In a case where a communication apparatus fails in authentication when acquiring communication parameters from another communication apparatus and where it is determined that an authentication request signal received from the other communication apparatus has been transmitted by unicast, the communication apparatus notifies said other communication apparatus of an error. On the other hand, even in a case where the communication apparatus fails in authentication, when it is determined that the authentication request signal received from the other communication apparatus has not been transmitted by unicast, the communication apparatus does not notify said other communication apparatus of an error.

12 Claims, 6 Drawing Sheets

COMMUNICATION APPARATUS, METHOD FOR CONTROLLING THE SAME, AND PROGRAM

CROSS-REFERENCE TO RELATED APPLICATION

This application is a Continuation of U.S. application Ser. No. 15/212,999 filed Jul. 18, 2016, which claims the benefit of Japanese Patent Application No. 2015-144398, filed Jul. 21, 2015. These documents are hereby incorporated by reference herein in their entirety.

BACKGROUND OF THE INVENTION

Field of the Invention

The present invention relates to an apparatus for communicating communication parameters.

Description of the Related Art

When a communication apparatus is to be connected to a wireless network to perform communication, it is necessary to set various communication parameters such as the encryption method, the encryption key, the authentication method, and the authentication key. A technique for facilitating setting of these communication parameters is discussed in Japanese Patent Application Laid-Open No. 2014-60623. In the technique discussed in Japanese Patent Application Laid-Open No. 2014-60623, a communication apparatus displays a Quick Response (QR) code (registered trademark, omitted hereinafter) including information of communication parameters. The communication apparatus captures and reads an image of the QR code, and sets the read communication parameters to an access point.

However, if the communication parameters are set only through image capturing, communication can be easily performed via a wireless network, causing a security problem.

A conceivable solution for this problem is to cause the communication apparatus which displays the QR code information and the communication apparatus which captured the QR code information to authenticate each other, and, when authentication succeeds, to transfer the communication parameters to maintain security.

If one communication apparatus knows the media access control (MAC) address of the other communication apparatus, one communication apparatus is able to transmit an authentication request signal by unicast to the other communication apparatus. However, if one communication apparatus does not know the MAC address of the other communication apparatus, one communication apparatus needs to transmit the authentication request signal by broadcast or multicast.

When one communication apparatus transmits the authentication request signal by broadcast or multicast, the request signal will reach also unintended apparatuses (apparatuses other than an intended communication partner apparatus), and an error response is returned from the unintended apparatus. There is a possibility that, if the error response is returned, the communication partner apparatus interrupts processing or fails in the processing.

SUMMARY OF THE INVENTION

The present invention is directed to reducing the possibility that, when a communication apparatus acquires communication parameters, an error notification from an unintended apparatus causes an interruption or failure in communication parameter provision processing.

According to an aspect of the present invention, a communication apparatus includes, a reception unit configured to, when acquiring communication parameters from another communication apparatus, receive an authentication request signal transmitted from said other communication apparatus, an authentication unit configured to authenticate said other communication apparatus based on identification information included in the authentication request signal, a determination unit configured to determine whether the authentication request signal has been transmitted by unicast, a notification unit configured to notify said other communication apparatus of an error in a case where authentication by the authentication unit fails and where it is determined that the authentication request signal has been transmitted by unicast, and an acquisition unit configured to acquire communication parameters from said other communication apparatus in a case where authentication by the authentication unit succeeds. Even in a case where authentication by the authentication unit fails, when it is determined that the authentication request signal has not been transmitted by unicast, the notification unit does not notify said other communication apparatus of an error.

Further features of the present invention will become apparent from the following description of exemplary embodiments with reference to the attached drawings.

DESCRIPTION OF THE EMBODIMENTS

A communication apparatus according to the present exemplary embodiment will be described in detail below with reference to the accompanying drawings. The following describes an example using a wireless local area network (LAN) system conforming to the Institute of Electrical and Electronics Engineers, Inc. (IEEE) 802.11 series. However, the communication method is not limited to a wireless LAN conforming to the IEEE 802.11 series. For example, the present exemplary embodiment is also applicable to a communication apparatus conforming to other wireless communication methods such as Bluetooth (registered trademark, omitted hereinafter) and ZigBee. The present exemplary embodiment is also applicable to a communication apparatus conforming to a wired communication method such as a wired LAN.

Figure 1:
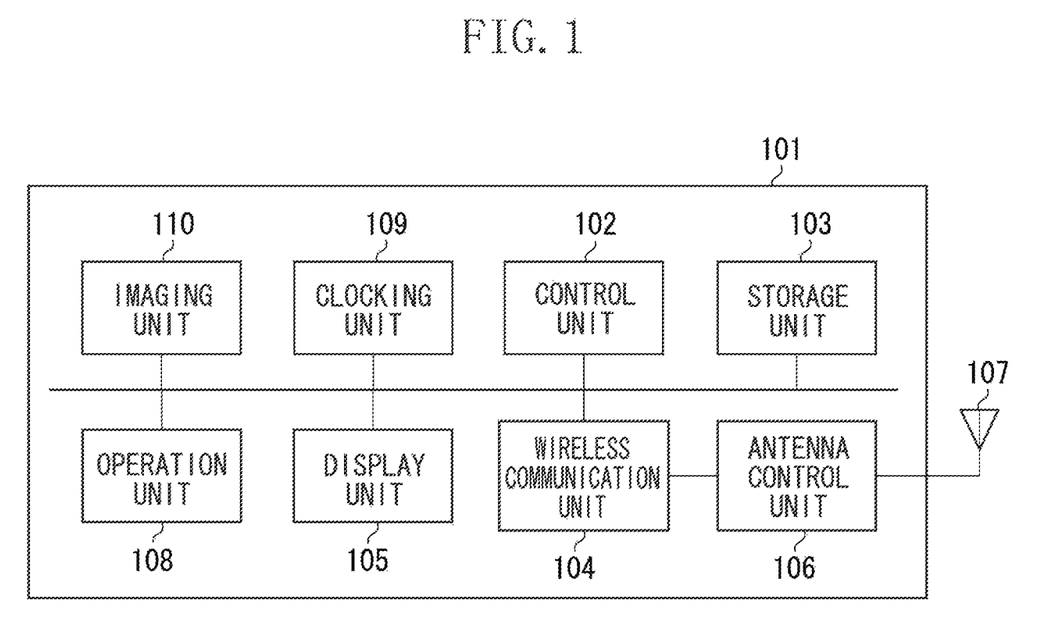
FIG. 1 illustrates a hardware configuration of a communication apparatus.

FIG. 1 is a block diagram illustrating a hardware configuration of an entire communication apparatus 101. A control unit 102 includes a central processing unit (CPU) or microprocessor unit (MPU), and controls the entire communication apparatus 101 by executing a program stored in a storage unit 103. The control unit 102 may control the entire communication apparatus 101 in cooperation with an operating system (OS) currently being executed. The control unit 102 also performs control for communicating and sharing communication parameters with other communication apparatuses.

A storage unit 103 includes a read only memory (ROM) and a random access memory (RAM), and stores programs for performing various operations (described below) and various information such as communication parameters for wireless communication. Various operations (described below) are implemented when the control unit 102 executes a control program stored in the storage unit 103. The storage unit 103 may be not only a memory such as a ROM and a RAM but also a storage medium such as a flexible disk, a hard disk, an optical disk, a magneto-optical disk, a compact disc read only memory (CD-ROM), a compact disc recordable (CD-R), a magnetic tape, a nonvolatile memory card, and a digital versatile disc (DVD).

A wireless communication unit 104 performs, for example, wireless LAN communication conforming to the IEEE 802.11 series. Wireless communication includes short-distance wireless communication, for example, Near Field Communication (NFC). A display unit 105 such as a liquid crystal display (LCD) and a light emitting diode (LED) performs various display, and has a function of outputting visually recognizable information, or a function of outputting sound as a speaker, for example. The display unit 105 is provided with a function of outputting at least one of the visual information and the sound information. The display unit 105 also performs QR code display.

Instead of being displayed on the display unit 105, the QR code put on a seal may be stuck on the housing of the communication apparatus 101 or stuck on an accessory of the communication apparatus 101, such as the operation manual and the packing material (corrugated paper, etc.) to be used at the time of vending. The QR code may also be directly put on the communication apparatus or its accessory.

An antenna control unit 106 controls an antenna 107. An operation unit 108 enables a user to input various information to operate the communication apparatus 101. A clocking unit 109 detects the progress of time. An imaging unit 110 captures an image. When reading the QR code, the control unit 102 analyzes the image input from the imaging unit 110 to recognize it as data such as authentication information.

Figure 2:
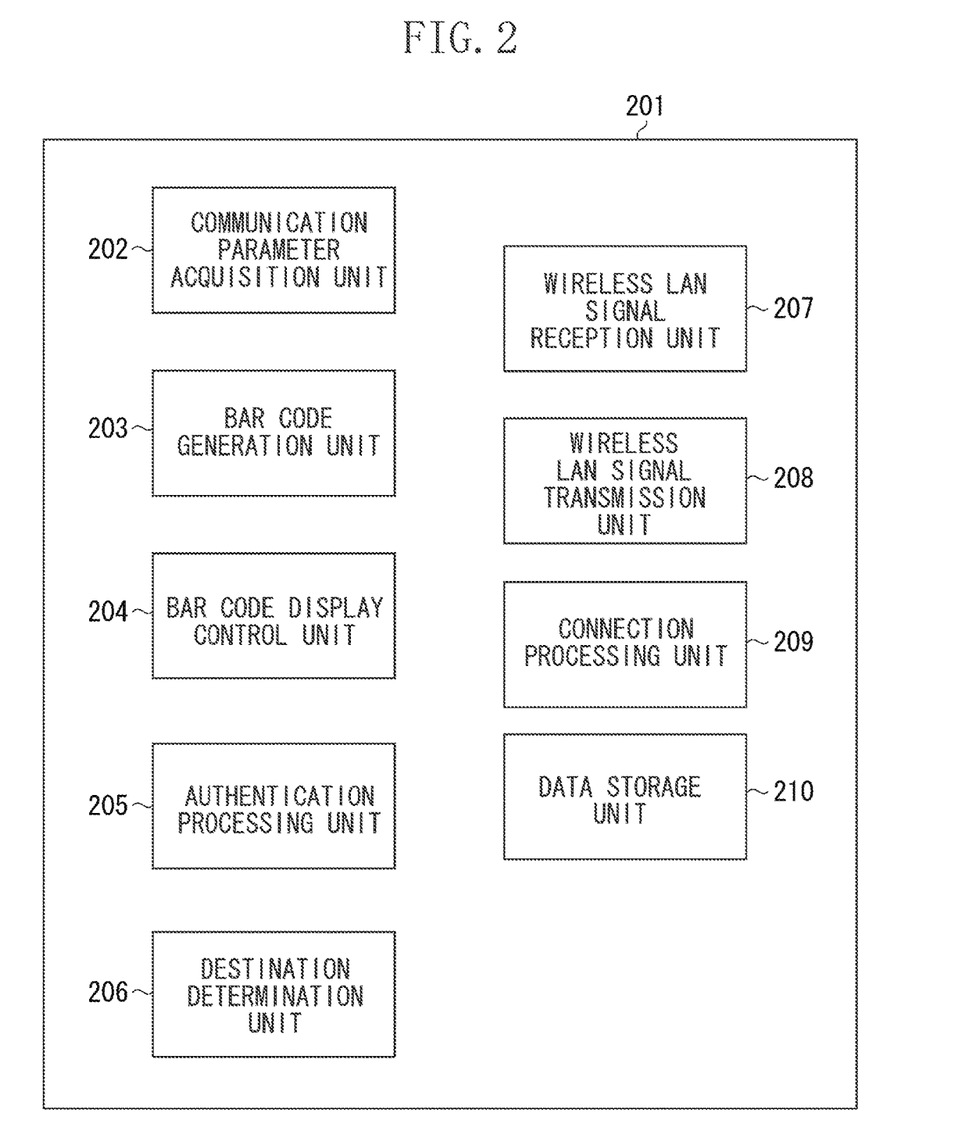
FIG. 2 illustrates a software configuration of the communication apparatus.

FIG. 2 is a block diagram illustrating software function blocks, i.e., a software function configuration 201, of the communication apparatus 101.

A communication parameter acquisition unit 202 acquires communication parameters required by the communication apparatus 101 to wirelessly communicate with other communication apparatuses such as an access point (AP) and a station (STA). The AP and STA respectively operate as an AP and a STA in the infrastructure mode defined in the IEEE 802.11 series standard. The AP and STA may be respectively replaced with a Group Owner (GO) having an equivalent function to an AP and a client (CL) having an equivalent function to a STA in Wi-Fi Direct standardized by Wi-Fi Alliance. In this case, the communication parameters include the Service Set Identifier (SSID) which is the identifier of the wireless network configured by the AP (GO), and the encryption method, the encryption key, the authentication method, and the authentication key used for the wireless network. The communication parameters may include any one of the above-described parameters.

The communication parameter acquisition unit 202 may further acquire communication parameters for upper level services, such as the Internet Protocol (IP) address and function information of other communication apparatuses.

A bar code generation unit 203 generates a QR code including the authentication information, the identifier of the communication apparatus, etc. required to share communication parameters. In addition to or instead of the QR code, the bar code generation unit 203 may generate other two-dimensional code such as the Computer Purpose (CP) code, or generate a one-dimensional bar code.

A bar code display control unit 204 displays the bar code generated by the bar code generation unit 203 on the display unit 105. An authentication processing unit 205 performs authentication processing with a communication parameter providing apparatus (hereinafter referred to as a parameter providing apparatus). A destination determination unit 206 determines the destination address of a received signal. A wireless LAN signal reception unit 207 and a wireless LAN signal transmission unit 208 perform wireless LAN communication conforming to the IEEE 802.11 series standard with other communication apparatuses.

A connection processing unit 209 performs processing for connecting with the wireless network configured by the AP (GO). A data storage unit 210 stores such information as software programs themselves, communication parameters, authentication information, identifiers, and the generated QR code.

All of the function blocks are related with each other on a software or hardware basis. The above-described function blocks are only an example. A plurality of function blocks may configure one function block, and a certain function block may be divided into a plurality of function blocks.

Figure 3:
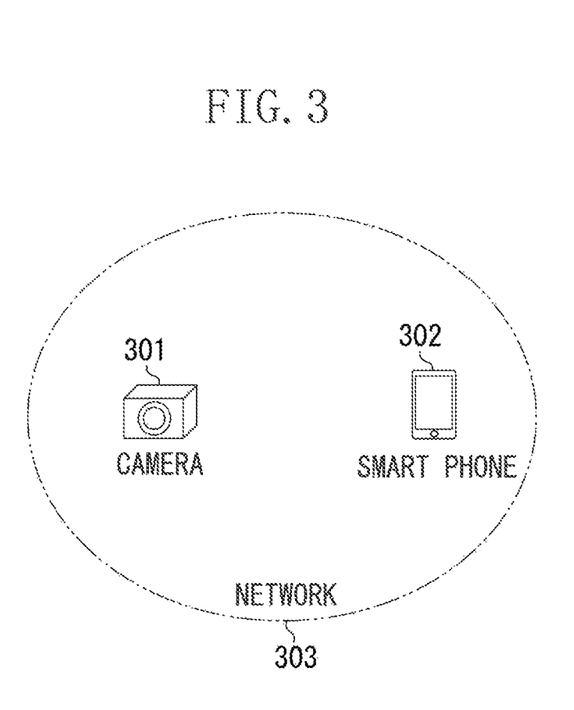
FIG. 3 illustrates a configuration of a communication system.

FIG. 3 illustrates a configuration of a network system according to the present exemplary embodiment, including a camera 301 (hereinafter referred to as a communication apparatus) and a smart phone 302 (hereinafter referred to as a providing apparatus). In this case, the providing apparatus (AP or GO) provides the communication apparatus with the communication parameters. Further, the providing apparatus constructs a wireless network 303 (hereinafter referred to as a network).

In the present exemplary embodiment, the communication apparatus has the above-described configuration illustrated in FIGS. 1 and 2. The communication apparatus further holds authentication information to be used in communication parameter exchange processing (described below). The authentication information is information used to enhance security in the communication parameter exchange processing, and includes the public key, the certificate, and the password of the communication apparatus. The communication apparatus generates a QR code including the authentication information, and displays it on the display unit 105. In this case, the public key is one type of encryption key to be used in the public key encryption method.

The providing apparatus captures and reads the QR code of the communication apparatus to acquire the authentication information. Then, the providing apparatus performs the authentication processing with the communication apparatus by using the acquired authentication information, and provides the communication apparatus with the communication parameters. The communication parameters may be setting information of a wireless network to be constructed by the providing apparatus itself, or setting information of a wireless network to be constructed by the other AP.

Figure 4:
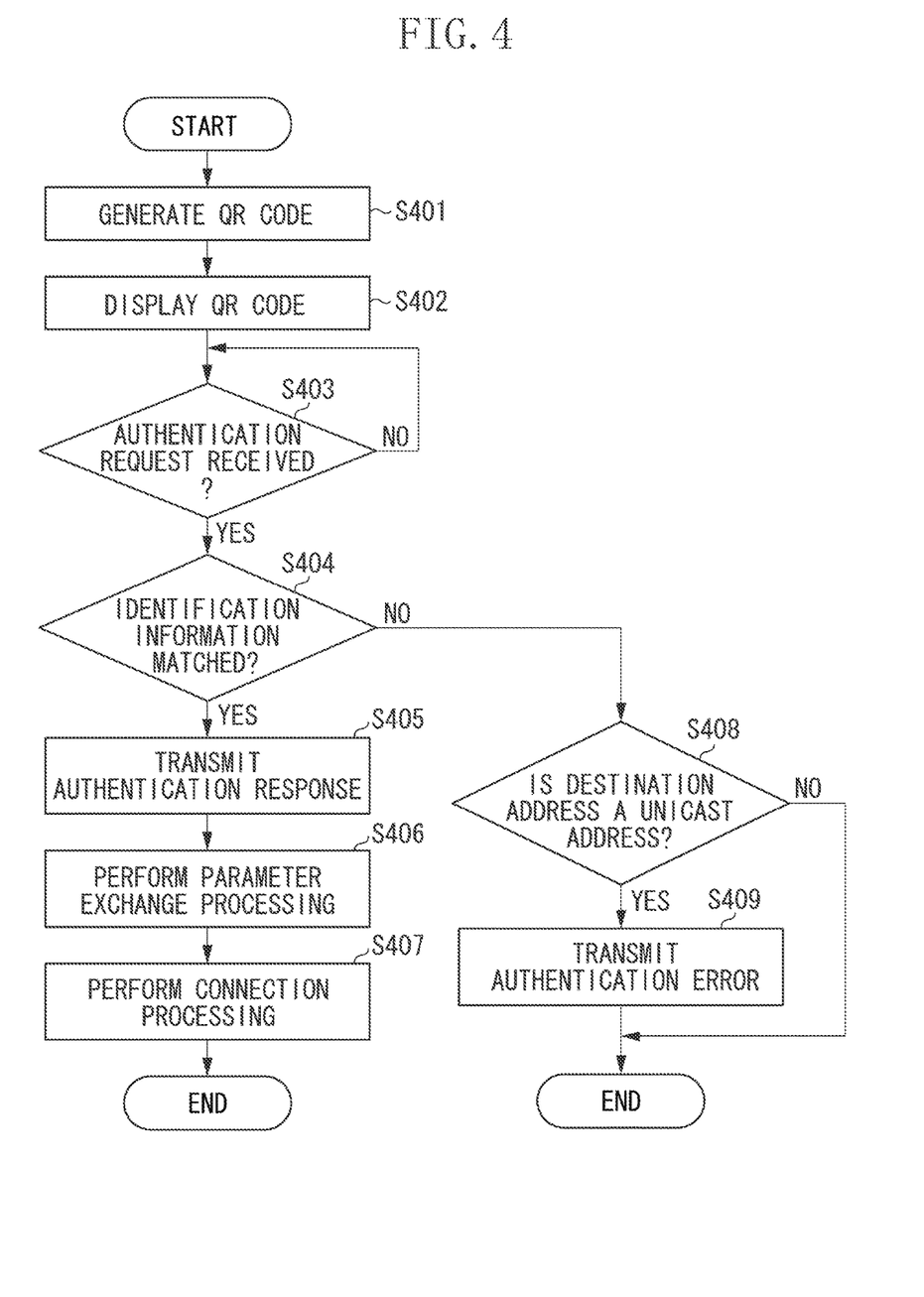
FIG. 4 is a flowchart illustrating processing implemented by the communication apparatus.

FIG. 4 is a flowchart illustrating processing performed by the communication apparatus to acquire communication parameters from the providing apparatus. This processing is implemented when the control unit 102 reads a program stored in the storage unit 103 and then executes it.

In step S401, the communication apparatus generates a QR code including the authentication information. At this stage, the QR code may include information other than the authentication information. For example, the QR code may include the MAC address specific to the communication apparatus as the identifier of the communication apparatus. By including the identifier of the communication apparatus, it becomes easier for the providing apparatus to perform communication apparatus search processing. As information specific to the communication apparatus, the Universally Unique Identifier (UUID) may be used instead of the MAC address.

Although the QR code generation is triggered by a user operation, the trigger is not limited thereto. The QR code generation may be triggered upon reception of a predetermined signal or upon satisfaction of a predetermined condition (such as a predetermined time and a predetermined location).

In step S402, the communication apparatus displays the QR code generated in step S401 on the display unit 105. In step S403, the communication apparatus waits for reception of an authentication request signal. In the present case, the Action frame defined in the IEEE 802.11 series is used as the authentication request signal. However, the authentication request signal is not limited thereto. The Extensible Authentication Protocol (EAP) signal may also be used.

The providing apparatus captures and analyzes the QR code displayed on the display unit 105 to acquire the authentication information of the communication apparatus. Then, the providing apparatus generates identification information based on the authentication information. In the present case, the QR code includes public key information as the authentication information, and the providing apparatus acquires the identification information by calculating the hash value for the public key. A method for acquiring the identification information from the authentication information is shared in advance by both apparatuses.

However, the method for acquiring the identification information is not limited thereto. The hash value calculated from a part or whole of the authentication information, or a part of the authentication information may be used as the identification information. The providing apparatus transmits the authentication request signal including the identification information. In addition to the identification information, the authentication request signal may include other information to be used for the authentication processing, such as the encryption key of the providing apparatus, and a random number.

When the communication apparatus receives the authentication request signal (YES in step S403), in step S404, the communication apparatus performs the authentication processing based on the identification information included in the authentication request signal. More specifically, similar to the providing apparatus, the communication apparatus also calculates the identification information based on the authentication information and determines whether the identification information calculated by the communication apparatus coincides with the identification information included in the authentication request signal.

Instead of calculating the identification information, the communication apparatus may prestore the identification information calculated based on the authentication information in the storage unit 103. In this case, the communication apparatus determines whether the identification information stored in the storage unit 103 coincides with the identification information included in the authentication request signal.

When the identification information is mismatched, i.e., when authentication fails (NO in step S404), then in step S408, the communication apparatus determines whether the received authentication request signal has been transmitted by unicast. In this case, the communication apparatus confirms whether the destination address of the authentication request signal is the MAC address of the communication apparatus. When the destination address is the MAC address of the communication apparatus, the communication apparatus determines that the received authentication request signal has been transmitted by unicast. On the other hand, when the destination address setting is an address other than the MAC address specific to the communication apparatus, such as a multicast address and a broadcast address, the communication apparatus determines that the authentication request signal has not been transmitted by unicast.

When the communication apparatus determines that the authentication request signal has been transmitted by unicast (YES in step S408), then in step S409, the communication apparatus transmits an error signal indicating that authentication has failed, to the providing apparatus. Similar to the authentication request signal, the Action frame or the EAP signal can be used as an error signal.

On the other hand, when the communication apparatus determines that the authentication request signal has not been transmitted by unicast (NO in step S408), the communication apparatus ends the processing illustrated in FIG. 4 without transmitting an error signal. Instead of exiting the flowchart, the processing may return to step S403, and the communication apparatus may wait for reception of the authentication request signal.

More specifically, if authentication fails, the communication apparatus transmits an error signal when the authentication request signal has been transmitted by unicast, and does not transmit the error signal when the authentication request signal is not transmitted by unicast. This enables transmitting a required error signal to the providing apparatus while reducing the possibility of transmitting an unnecessary error signal.

Although, in this case, the communication apparatus determines whether the authentication request signal has been transmitted by unicast according to whether the destination address is the MAC address of the communication apparatus, the determination is not limited thereto. The communication apparatus may make the determination according to whether the destination address is a broadcast address or a multicast address. In this case, the communication apparatus transmits the error signal when the destination address is neither a broadcast address nor a multicast address, and does not transmit an error signal when the destination address is either of these addresses.

On the other hand, when authentication succeeds, i.e., when the identification information is matched (YES in step S404), then in step S405, the communication apparatus transmits an authentication response signal indicating that authentication succeeded, to the providing apparatus. The authentication response signal includes information required for authentication in the providing apparatus, such as the identification information, the authentication information, the encryption key, and a random number. Further, security can be enhanced by encrypting information such as the authentication information, the encryption key, etc. before transmission. The encryption can be implemented by using the Diffie-Hellman (DH) key sharing method or the public key encryption method. After the authentication processing, both the communication apparatus and the providing apparatus hold the shared key to be used for subsequent encryption communication.

In this case, the communication apparatus transmits the authentication response signal regardless of whether the authentication request signal has been transmitted by unicast. This enables suitably performing the authentication processing even when the providing apparatus transmits the authentication request signal by broadcast.

When the communication apparatus transmits the authentication response signal, the providing apparatus authenticates the communication apparatus based on information included in the authentication response signal.

When the authentication processing succeeds between the communication apparatus and the providing apparatus in this way, then in step S406, the communication apparatus performs processing for acquiring and setting communication parameters. This processing is referred to as communication parameter exchange processing.

More specifically, the communication apparatus transmits a setting request signal requesting for communication parameters to the providing apparatus, and, in response to this request, the providing apparatus returns a response signal including communication parameters to the communication apparatus. The communication parameters are encrypted by using the common key shared in the authentication processing. Thus, security when providing communication parameters can be enhanced.

When the communication apparatus acquires the communication parameters, then in step S407, the communication apparatus connects to the wireless network by using the acquired communication parameters. Then, the communication apparatus performs wireless communication with other communication apparatuses.

Figure 5:
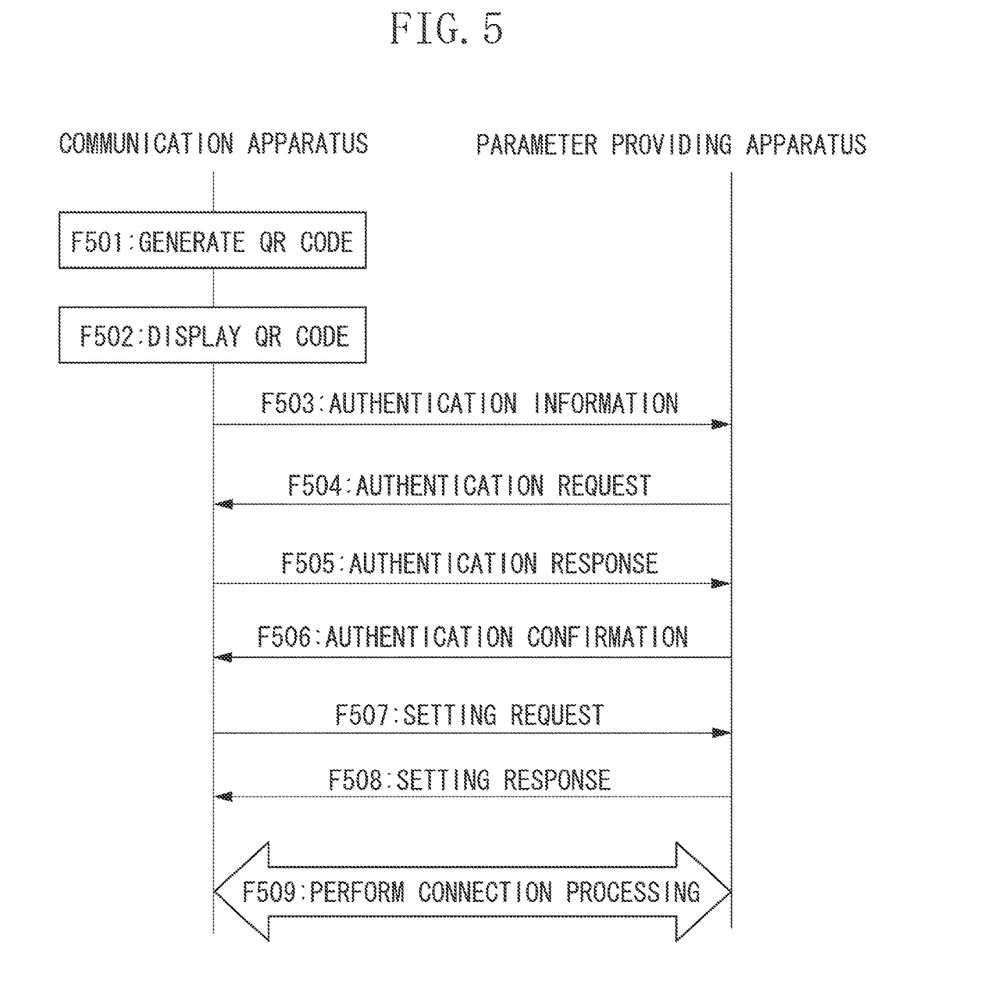
FIG. 5 is a sequence diagram illustrating processing between communication apparatuses.

FIG. 5 is a sequence diagram illustrating processing performed by the communication apparatus, operating based on the above-described flowchart, to acquire the communication parameters from the providing apparatus.

In step F501, the communication apparatus generates a QR code including the authentication information. In the present case, the information of the MAC address of the communication apparatus is not included in the QR code. In step F502, the communication apparatus displays the generated QR code on the display unit. In step F503, the providing apparatus reads the QR code of the communication apparatus to acquire the authentication information.

In step F504, the providing apparatus transmits the authentication request signal including the identification information calculated based on the authentication information. In the present case, the MAC address of the communication apparatus is not included in the QR code and therefore the providing apparatus cannot recognize the MAC address of the communication apparatus. Therefore, the providing apparatus transmits the authentication request signal by broadcast.

Upon reception of the authentication request signal, the communication apparatus performs the authentication processing based on the identification information included in the signal. When the authentication succeeds, then in step F505, the communication apparatus transmits the authentication response signal including the encryption key information to the providing apparatus. In this example, the authentication request signal is transmitted by broadcast. Therefore, if the authentication processing fails, the communication apparatus does not transmit an error signal.

The providing apparatus receives the authentication response signal and then performs the authentication processing based on the information included in the signal. When authentication succeeds, then in step F506, the providing apparatus transmits an authentication confirmation signal to the communication apparatus to notify the communication apparatus of the success of authentication.

Upon reception of the authentication confirmation signal, then in step F507, the communication apparatus transmits the setting request signal requesting for communication parameters, to the providing apparatus. Upon reception of the setting request signal, then in step F508, the providing apparatus transmits a setting response signal including the communication parameters to the communication apparatus. The communication parameters can be encrypted by using the common key shared in the authentication processing.

When the communication apparatus acquires the communication parameters, then in step F509, the communication apparatus connects to the wireless network constructed by the providing apparatus. When the connection is completed, the communication apparatus can perform data communication with the providing apparatus on the wireless network.

Figure 6:
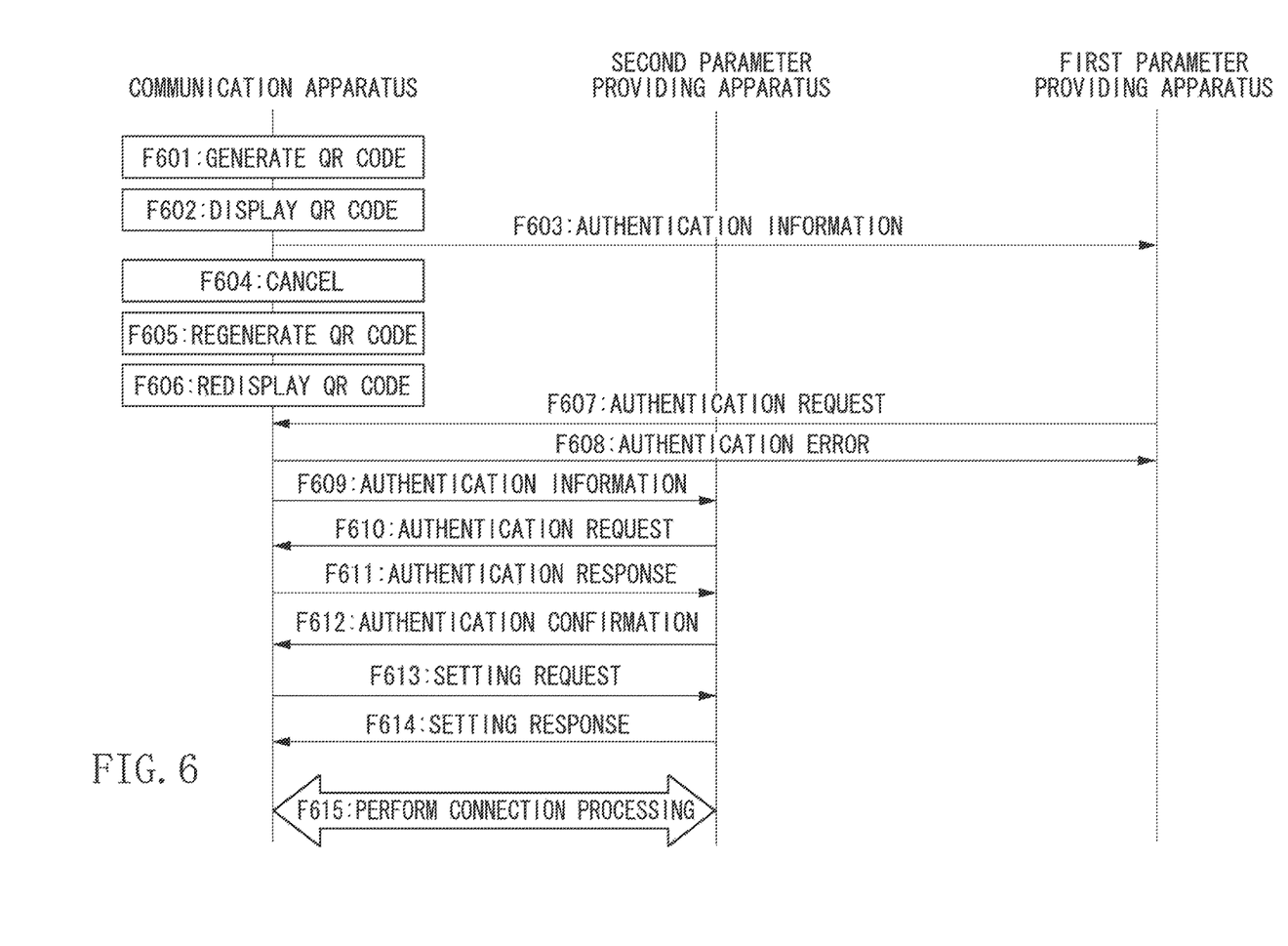
FIG. 6 is a sequence diagram illustrating processing between communication apparatuses.

FIG. 6 is another sequence diagram illustrating processing performed by the communication apparatus operating based on the above-described flowchart, to acquire the communication parameters from the providing apparatus. FIG. 6 illustrates a case where the communication apparatus interrupts the communication parameter acquisition processing with a first parameter providing apparatus (hereinafter referred to as a first providing apparatus) and then performs the communication parameter acquisition processing with a second parameter providing apparatus (hereinafter referred to as a second providing apparatus).

In step F601, the communication apparatus performs the QR code generation. In the present case, the communication apparatus generates a QR code including the authentication information and the MAC address of the communication apparatus. In step F602, the communication apparatus displays the generated QR code.

In step F603, the first providing apparatus reads the QR code displayed by the communication apparatus to acquire the authentication information and the MAC address of the communication apparatus. In step F604, a user operation cancels the processing for setting the communication parameters of the communication apparatus. Subsequently, a user operation for connecting with another providing apparatus (in this case, the second providing apparatus) is performed.

When the user operation is performed, then in step F605, the communication apparatus regenerates a QR code in response to the user operation. At this time, to secure security, the communication apparatus generates a QR code by using authentication information different from that used in step F601. Thus, the authentication processing can be prevented from being performed by using the authentication information before cancellation.

In step F607, since the first providing apparatus has acquired the MAC address of the communication apparatus, the first providing apparatus transmits the authentication request signal to the communication apparatus by unicast. Since the first providing apparatus has calculated the identification information by using the authentication information before cancellation, this identification information does not coincide with the identification information calculated by the communication apparatus. In step F608, the communication apparatus determines that the authentication request signal has been transmitted to the MAC address of the communication apparatus by unicast, and therefore transmits an error signal to the first providing apparatus. Upon reception of the error signal, the first providing apparatus interrupts the processing. At this time, error information may be displayed on a user interface (UI) of the first providing apparatus.

In steps F609 to F615, the communication apparatus performs the processing with the second providing apparatus. Since the processing in steps F609 to F615 is similar to the processing in steps F503 to F509, redundant descriptions thereof will be omitted.

When the communication apparatus succeeds in connection processing with the wireless network constructed by the second providing apparatus, the communication apparatus can perform data communication with the second providing apparatus.

As described above, according to the present exemplary embodiment, the communication apparatus performs processing for mismatched identification information in different ways depending on the destination. More specifically, the communication apparatus notifies the providing apparatus of an error the destination is limited, but does not notify the providing apparatus of an error the destination is not limited. Thus, the possibility can be reduced that the providing apparatus receives an error notification from apparatuses other than the intended communication apparatus. As a result, the possibility can be reduced that an unnecessary error notification causes the communication parameter providing apparatus to suffer an interruption or failure of the processing. More specifically, when the communication apparatus acquires communication parameters, it is possible to reduce the possibility that an error notification from an unintended apparatus causes an interruption or failure in communication parameter provision processing of other communication apparatus.

In the above-described exemplary embodiment, a method for providing authentication information by using the QR code is described. However, the method is not limited thereto. The authentication information may be provided by using a method for communication at a distance different from that of the IEEE 802.11 series, such as NFC, Bluetooth, ZigBee, and TransferJet. For example, it is also possible to provide the authentication information by using NFC and acquire the communication parameters by using a communication method conforming to the IEEE 802.11 series.

It is also possible to provide the authentication information by using a communication method conforming to IEEE 802.11ad and acquire the communication parameters by using a communication method conforming to IEEE 802.11ac. More specifically, it is also possible to provide the authentication information by using a communication method with a narrow communication range and acquire the communication parameters by using a communication method providing a wider communication range than the one provided by the former communication method. This enables limitation of the range of authentication information provision, and also acquisition of the communication parameters even in a case where the distance between communication apparatuses is increased after the authentication information is provided.

The present exemplary embodiment can also be achieved when a program for implementing at least one of the above-described functions is supplied to a system or apparatus via a network or storage medium, and at least one processor in a computer of the system or apparatus reads and executes the program. The present exemplary embodiment can also be achieved by a circuit (for example, an application specific integrated circuit (ASIC)) for implementing at least one of the functions.

According to the present exemplary embodiment, it is possible, when a communication apparatus acquires communication parameters, to reduce the possibility that an error notification from another apparatus unintended by the communication apparatus causes an interruption or failure in communication parameter provision processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A communication apparatus comprising:
   one or more processors; and
   one or more memories including instructions that, when executed by the one or more processors, cause the communication apparatus to:
   transmit an authentication request signal to another communication apparatus in a case where the communication apparatus provides the another communication apparatus with a communication parameter to be used for connecting to a wireless network;
   receive an error notification from the another communication apparatus in a case where the authentication request signal is transmitted by unicast and authentication processing based on the authentication request signal fails in the another communication apparatus,
   wherein in a case where the authentication request signal is transmitted by broadcast or multicast, the communication apparatus does not receive an error notification from the another communication apparatus even in a case where the authentication processing based on the authentication request signal fails in the another communication apparatus; and provide the another communication apparatus with the communication parameter in a case where a notification that the authentication processing based on the authentication request signal has succeeded in the another communication apparatus is received.

2. The communication apparatus according to claim 1, wherein the communication apparatus acquires authentication information about the another communication apparatus, and wherein the authentication request signal includes information based on the authentication information.

3. The communication apparatus according to claim 2, wherein the authentication information includes information of a public key of the another communication apparatus.

4. The communication apparatus according to claim 3, wherein the public key information includes a hush value for the public key.

5. The communication apparatus according to claim 2, wherein the communication apparatus acquires the authentication information by imaging a bar code or a two-dimensional code and analyzing the imaged code.

6. The communication apparatus according to claim 2, wherein the communication apparatus transmits the authentication request signal by unicast in a case where an identifier of the another communication apparatus is acquired by analyzing the imaged code and transmits the authentication request signal by broadcast or multicast in a case where the identifier is not acquired.

7. The communication apparatus according to claim 6, wherein the identifier is a media access control (MAC) address of the other communication apparatus.

8. The communication apparatus according to claim 2, wherein the communication apparatus images a Quick Response (QR) code and acquires the authentication information by analyzing the imaged QR code.

9. The communication apparatus according to claim 8, wherein the communication apparatus transmits the authentication request signal by unicast in a case where the communication apparatus acquires an identifier of the another communication apparatus and transmits the authentication request signal by broadcast or multicast in a case where the communication apparatus does not acquire the identifier of the another communication apparatus.

10. The communication apparatus according to claim 9, wherein the identifier is a media access control (MAC) address of the another communication apparatus.

11. A method for a communication apparatus comprising:
transmitting an authentication request signal to another communication apparatus in a case where the communication apparatus provides the another communication apparatus with a communication parameter to be used for connecting to a wireless network;

receiving an error notification from the another communication apparatus in a case where the authentication request signal is transmitted by unicast and authentication processing based on the authentication request signal fails in the another communication apparatus, wherein in a case where the authentication request signal is transmitted by broadcast or multicast, the communication apparatus does not receive an error notification from the another communication apparatus even in a case where the authentication processing based on the authentication request signal fails in the another communication apparatus; and providing the another communication apparatus with the communication parameter in a case where a notification that the authentication processing based on the authentication request signal has succeeded in the another communication apparatus is received.

12. A non-transitory computer readable storage medium storing instructions that, when executed, cause a communication apparatus to perform a process comprising:

transmitting an authentication request signal to another communication apparatus in a case where the communication apparatus provides the another communication apparatus with a communication parameter to be used for connecting to a wireless network;

receiving an error notification from the another communication apparatus in a case where the authentication request signal is transmitted by unicast and authentication processing based on the authentication request signal fails in the another communication apparatus, wherein in a case where the authentication request signal is transmitted by broadcast or multicast, the communication apparatus does not receive an error notification from the another communication apparatus even in a case where the authentication processing based on the authentication request signal fails in the another communication apparatus; and providing the another communication apparatus with the communication parameter in a case where a notification that the authentication processing based on the authentication request signal has succeeded in the another communication apparatus is received.

* * * * *